UNITED STATES PATENT OFFICE.

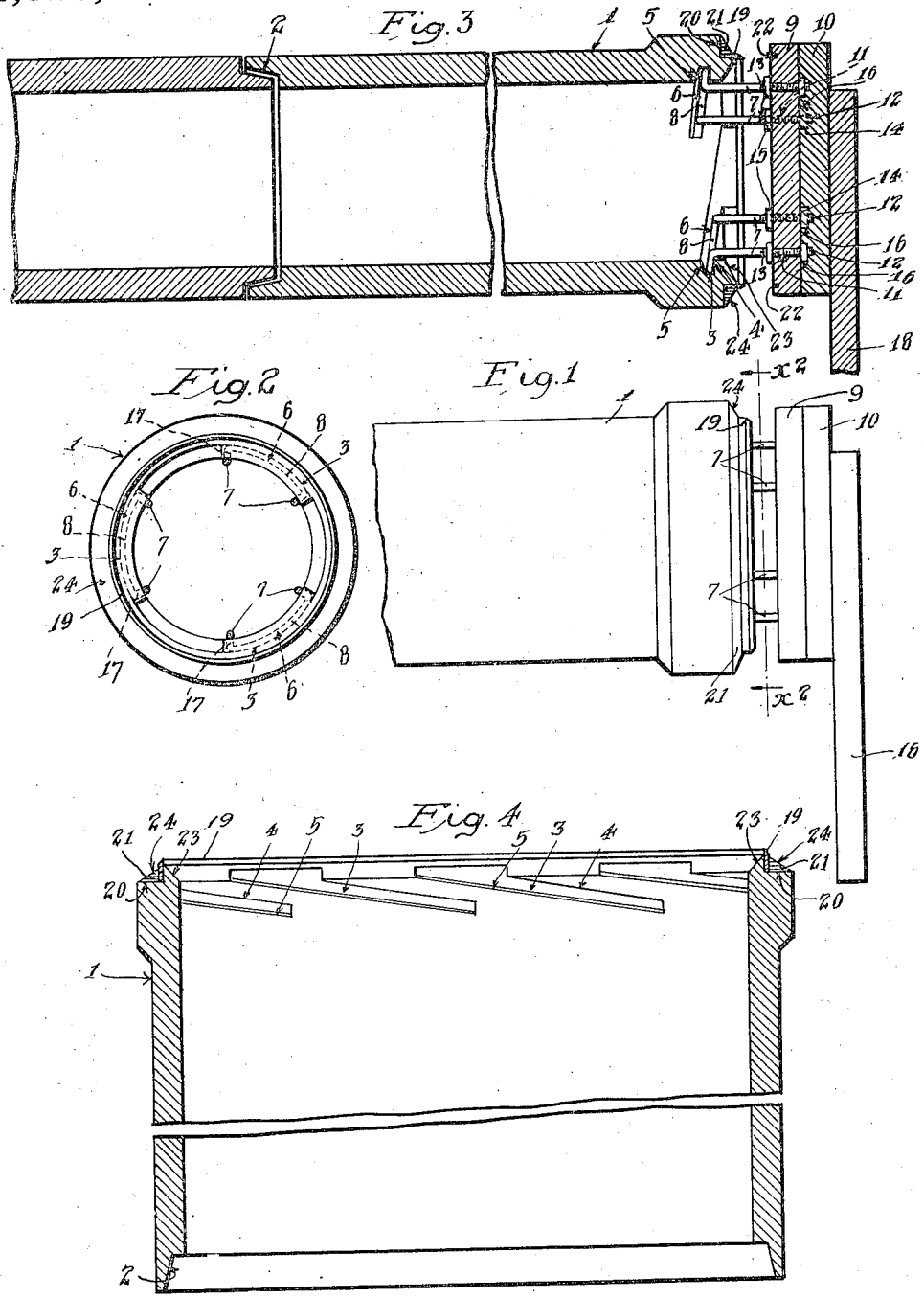

FRED JARBOE AND ROGER G. WEBSTER, OF HOLTVILLE, CALIFORNIA.

WATER-TIGHT HEAD-GATE.

1,320,472.   Specification of Letters Patent.   Patented Nov. 4, 1919.

Application filed January 15, 1919.   Serial No. 271,285.

*To all whom it may concern:*

Be it known that we, FRED JARBOE and ROGER G. WEBSTER, both citizens of the United States, residing at Holtville, in the county of Imperial and State of California, have invented a new and useful Water-Tight Head-Gate, of which the following is a specification.

This invention relates to gates for regulating the flow of fluids through pipes and an object of the invention is to provide a head-gate of simple construction capable of preventing any material leakage when the gate is closed.

Another object is to produce a construction that will out-last the old forms of head-gates used in irrigation and other exposed works.

Another object is to so construct the gate that it may be closed and opened by rotating it.

Another object is to provide a novel construction of screw-threaded connection between the gate and head.

Another object is to make provision for the cutting of weeds and the like that may tend to choke the opening between the head and gate when the gate is open and prevent closing thereof.

Other objects and advantages will appear in the subjoined detailed description.

The accompanying drawings illustrate the invention:

Figure 1 is a side elevation of a head-gate constructed in accordance with the provisions of this invention, the gate being shown in open position.

Fig. 2 is an end elevation, partly in section, from line indicated by $x^2$—$x^2$, Fig. 1.

Fig. 3 is a longitudinal mid-section of the head-gate shown in Fig. 1, a fragment of a pipe section also being shown.

Fig. 4 is a developed view of the inside face of the head.

There is provided a tubular head 1 and said head may be formed on the end of a section of pipe so as to constitute a portion of said section, or the head may be provided in one end with an annular recess 2 so that it may be readily connected with a plain pipe section. The head 1 may be formed of concrete or cement, such material being more durable and less expensive than metal.

At its front end the head 1 is provided with screw-threads 3, and said threads as shown may be of multiple construction. In this instance there are three separate screw-threads though it is understood that the number may be greater or less as desired. The front walls 4 of the screw-threads are perpendicular to the longitudinal axis of the head and the rear walls 5 of the screw-threads extend aslant inward and rearward. This construction of the screw-threads is preferred, though not absolutely essential to the device.

Each of the screw-threads 3 is adapted to be engaged by a substantially U-shaped thread-engaging member 6 comprising a pair of fastening legs 7 and an intermediate thread-engaging portion 8. The member 6 may be constructed of wire or rod of suitable diameter. Viewed endwise the thread-engaging portion 8 is curved so as to substantially correspond to the curvature of the screw-threads 3. One of the legs 7 may be shorter than the other and viewed from the side the portion 8 extends aslant from the inner end of one of the legs 7 to the inner end of the other leg, the slant corresponding to that of the screw-thread in the head 1.

The legs 7 are secured to a gate which may be formed of any suitable material as, for instance, wood, and the gate in the instance shown in the drawings comprises two circular sections or disks 9, 10 which are fastened together by any suitable means, such as nails or screws, not shown. The legs 7 are fixed by suitable means to the gate 9, 10 and in this instance the fastening is accomplished by extending the legs 7 through holes 11 in the section 9 and into recesses 12 in the section 10. The legs 7 are screw-threaded at 13 to receive nuts 14, 15, the nuts 14 being accommodated in recesses 16 in the section 10 and bearing against the inner face of the section 9, and the nuts 15 bearing against the outer face of the section 9. It may be desirable to employ white lead or other suitable sealing substance in the holes 11 so as to insure water-tightness of the gate. It is clear that because of the provision of the screw-threads 13 and nuts 14, 15, the angle of the thread-engaging members 8 may be adjusted when first assembling the device so that said thread-engaging members will accurately correspond in angle to the screw-threads 3 when the gate is tight against the head.

If the member 6 is viewed endwise the legs 7 at their inner ends form outwardly bent portions 17 which extend substantially at right angles to the legs so that when the portions 8 are in the bottom of the screw-threads 3 sufficicent clearance will exist between the legs 7 and inside face of the head to avoid binding of the legs against the head.

The gate 9, 10 is provided with a suitable handle to turn it and in this instance the handle is formed by a laterally extending arm 18 fastened by nails, screws or the like, not shown, to the section 10 of the gate.

In practical operation, when it is desired to close the gate, assuming, for example, that the screw-threads 3 are right-hand, the arm 18 will be turned clockwise viewed from the front end of the head-gate to cause the thread-engaging portions 8 to travel in the screw-threads 3 toward the rear end of the head. To open the gate the handle 18 will be operated in the reverse direction to cause the thread-engaging portions 8 to unscrew from the head 1.

It is noted that, when the gate 9, 10 engages the front end of the head 1, the gate will be turned to a sufficient degree to cause the thread-engaging portion 8 and bent portions 17 to be drawn up tightly against the front walls 4 of the screw-threads so as to prevent any looseness between the head and gate, which looseness would of course result in leakage. However, owing to the rear walls 5 of the screw-threads being aslant as described above the thread-engaging portions 8 fit sufficiently loose in the screw-threads 3 as to allow the gate to be turned freely without undue friction.

The foregoing described construction embraces certain features of the invention which may be used independently of other features now to be described. The head 1 is provided at its front end with an annular knife blade 19 formed of any suitable material as, for instance, galvanized iron. To mount the knife blade 19 in place, the head 1 may be provided, when molded, with an annular recess 20. Then the knife blade 19 will be assembled in position in the recess 20 and a ring 21 of cement or the like will be cast in place in the recess upon the knife blade 19 so as to embrace the knife blade between the inner face of the ring 21 and the inner face of the recess 20. The knife blade 19 projects from the front end of the head 1 and the projecting portion is adapted to seat in an annular recess 22 formed in the inner face of the gate 9, 10.

The construction just described operates as follows: When the gate 9, 10 is being closed, if there should be any weeds, trash or the like caught between the head 1 and the gate, the knife blade 19 will sever the weeds or trash and the portions of the weeds or trash within the knife blade 19 will float into the head and the portions outside of said knife blade will be prevented from choking the entrance to the head and interfering with the tight closing of the gate.

It may be desirable, to facilitate the clearing of the weeds or trash away from the knife blade, to form the front end of the head with an inwardly and rearwardly slanting face 23 extending from the knife blade to the inside face of the head; and also to provide the ring 21 of the head with an outwardly and rearwardly sloping face 24 extending from the knife blade 19 to the periphery of the head. Owing to the provision of these slanting faces more space is provided between the head and gate so as to preclude the packing of the weeds or trash between the head and the gate.

It is also clear that any mud, which may tend to obstruct the closing of the gate, will be forced by the closing of the gate rearward because of the slanting faces 23, 24.

If the knife blade 19 should become unfit for cutting the weeds or trash, it can be readily removed by first cutting away the ring 21 and a new knife blade may then be substituted for the old one and a new ring be cast in place in lieu of the old ring.

The invention in its broader phases is not limited to the exact details of construction described above and shown in the drawings, but includes such changes and modifications as lie within the spirit and scope of the appended claims.

We claim:

1. A head-gate comprising a tubular head having a screw-thread, a gate, and a thread-engaging rod fastened at its ends to the gate and bent to fit the screw-thread in the head.

2. A head-gate comprising a tubular head having a screw-thread, a gate, a thread-engaging rod bent to fit the screw-thread in the head, and means adjustably fastening the ends of the rod to the gate.

3. A head-gate comprising a tubular head having multiple screw-threads, a gate, and thread-engaging rods bent to fit the respective screw-threads in the head, each of said rods being fastened at its ends to the gate.

4. A head-gate comprising a tubular head having multiple screw-threads, a gate, and substantially U-shaped members curved at their intermediate portions to fit the respective threads in the head, the legs of said members being fastened to the gate and the inner ends of the legs being bent outward substantially at right angles.

5. A head-gate comprising a tubular head having a screw-thread, a gate, and a member having a screw-thread-engaging portion spaced from the gate and having spaced legs fastened to the gate.

6. A head-gate comprising a tubular head, a knife blade projecting from one end of the head, a gate to close against the head, and means to move the gate toward and from the head.

7. A head-gate comprising a tubular head provided with an annular recess, a knife blade secured in said recess surrounding the bore at one end of the head and projecting from said end, a gate to close against the head, and means to move the gate toward and from the head.

8. A head-gate comprising a tubular head provided with an annular recess, an annular knife blade secured in said recess and projecting from one end of the head, a gate, and means whereby turning of the gate in one direction or another will cause the gate to move toward or from the head.

9. A head-gate comprising a tubular head provided with an annular recess, an annular knife blade secured in said recess and projecting from one end of the head, a gate, and a screw-threaded connection between the gate and head.

10. A head-gate comprising a tubular head, an annular knife blade projecting from one end of the head, a gate having an annular groove to receive the projecting portion of the knife blade, and means to move the gate toward and from the head.

Signed at Holtville, California, this 8th day of January, 1919.

FRED JARBOE.
ROGER G. WEBSTER.

Copies of this patent may be obtained for five cents each, by addressing the "Commissioner of Patents, Washington, D. C."